R. KRONENBERG.
REMOVABLE WHEEL RIM FOR PNEUMATIC TIRES.
APPLICATION FILED DEC. 21, 1907.
975,137.
Patented Nov. 8, 1910.
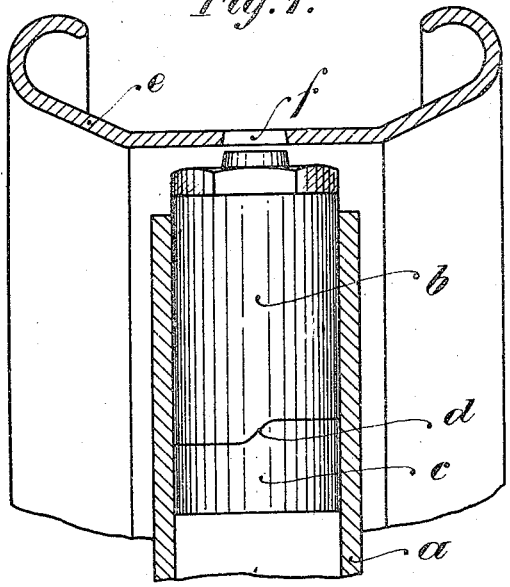
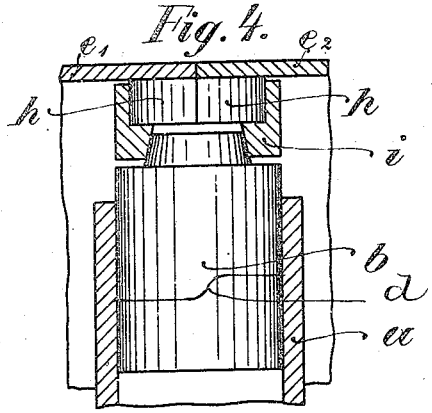
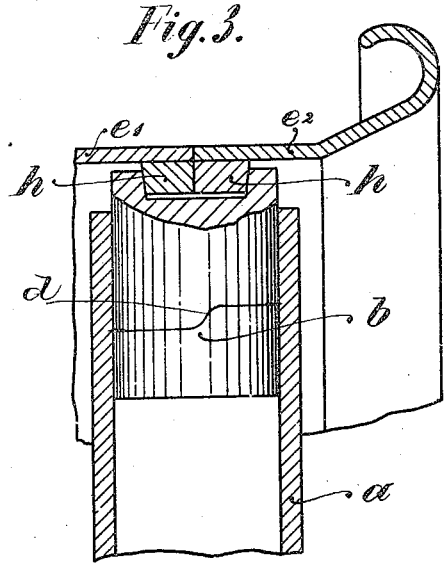
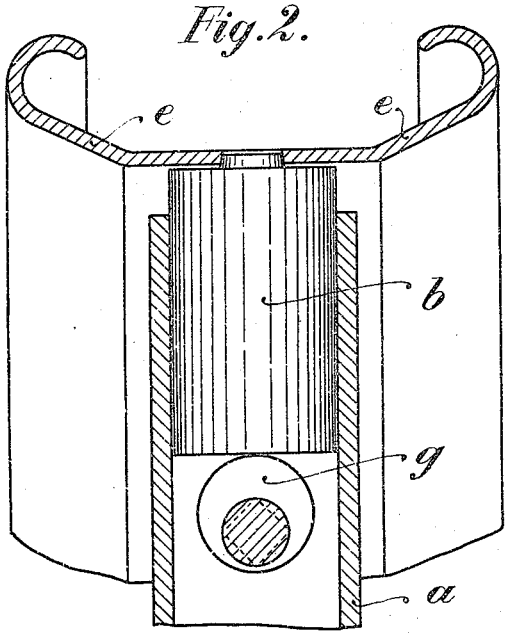
Witnesses:
Inventor
Rudolf Kronenberg
per
Attorney.

UNITED STATES PATENT OFFICE.

RUDOLF KRONENBERG, OF OHLIGS, GERMANY.

REMOVABLE WHEEL-RIM FOR PNEUMATIC TIRES.

975,137.     Specification of Letters Patent.     Patented Nov. 8, 1910.

Application filed December 21, 1907. Serial No. 407,461.

*To all whom it may concern:*

Be it known that I, RUDOLF KRONENBERG, a subject of the King of Prussia, German Emperor, residing at Ohligs, in the Province of the Rhine, Kingdom of Prussia, German Empire, have invented a certain new and useful Removable Wheel-Rim for Pneumatic Tires, of which the following is a specification.

This invention relates to a removable wheel rim for pneumatic tires, which is held fast upon the wheel by the ends of bolts longitudinally inserted in the hollow spokes.

The invention consists in providing the parts which are displaceable one within the other, with devices which render possible a shortening of the spoke by means of a simple and quick hand operation, whereby the rim is released for taking off. For this purpose the displaceable bolts are so supported in the interior of the spokes upon the curved surfaces, that they can be pressed by their own rotation or a rotation of the supporting body from out of the hollow spokes against the rim. This is advantageously effected by providing the bolts at the ends turned toward the hub with claw-shaped projections and recesses, which in the shortened position of the spokes engage in corresponding cavities or projections of a holding piece fixed in the hollow spokes. By means of a turning of the movable bolt against the hollow spoke there is then obtained, in consequence of the sloping contact surfaces provided on the claws, an elongation of the spokes and consequently a holding fast of the rim upon the wheel. Moreover the bolts according to this invention can also be protruded by having a cam placed underneath them in the fixed spokes.

The invention is clearly illustrated in the accompanying drawings, in which—

Figure 1 is a view partly in perspective and partly in section, showing my improved construction. Fig. 2 is a similar view of a modified form. Fig. 3 is a similar view with portions broken away, showing still another form. Fig. 4 is a detail in section with parts in elevation, showing still another form.

Like letters of reference indicate like parts throughout the several views.

As may be seen from these figures, the bolts $b$ are inserted in the outer ends of the tubular spokes $a$. These bolts form a fixed combination with the rim, but after being drawn into the interior of the spokes they admit of the quick removal of the wheel rim.

According to the construction illustrated in Fig. 1, the bolt $b$ presses with its lower surface upon a support $c$ fixed to the spoke. The contact surfaces of the two parts $b$ and $c$ are so constructed that projections of the one part engage in cavities of the other part. The projections are provided with sloping contact surfaces $d$, so that the bolt $b$ when it is turned against the fixed part $c$ lifts itself from the latter. The turning of the bolt can take place by means of a suitable tool, preferably a hexagonal piece is provided on the outer end of the bolt by aid of which the bolt can be turned by a key. The rim $e$ possesses openings $f$ opposite the ends of the spokes, in which openings there fit corresponding projections of the bolts $b$ when the same are caused to protrude. A return rotation of the bolt can be easily prevented by suitable locking devices of any kind.

Another constructional form is shown in Fig. 2, in which the bolt can be pushed out by means of a cam $g$ placed inside the spoke. When rims divide into two parts in their symmetrical plane, the mechanism can be so constructed that the projections, instead of being placed on the bolts, are placed on the parts of the rim and the bolts engaged over the projections by means of suitable slots or apertures. In Fig. 3 is illustrated a construction of this kind in which on the two halves of the rim $e^1$, $e^2$, semicircular projections $h$ are provided, which, after the assembly of the two parts of the rim, form together a truncated cone of small taper. Over this cone the bolt $b$ engages by means of a corresponding cavity.

In order to avoid in connection with the last described constructional form the inconvenience that the halves of the tire are not connected one to another before they are assembled upon the wheel, the construction may be so carried out that the adjustable bolts do not engage immediately by the aid of a lifting device over the parts $h$ placed respectively on each of the two halves of the rim, but there is a division of the bolt $b$ in the manner illustrated in the drawing. The bolt itself then retains the shape shown in connection with undivided rims, but it then presses with its end upon a special intermediate piece $i$ which holds together the parts $h$. The latter is connected by an attachment of any kind such as a screw thread, bayonet closure, or the like. The latter is first easily attached to the parts $h$ by means of a convenient connection of any kind such as a screw threading, bayonet catch or the like, and then the rim is brought upon the wheel in order after the pressing out of the bolt to form a rigid whole therewith.

Having now particularly described and ascertained the nature of my said invention and in what manner the same is to be performed, I declare that what I claim is:

1. A wheel rim in halves provided with semi-circular projections extending radially inwardly, clamping rings $i$ fitting over said projections having socket holes in line with the spokes in combination with pins movably secured in the ends of the spokes and of means to force the heads of the pins into the socket holes substantially as described.

2. A wheel rim in halves provided with semi-circular projections extending radially inwardly, clamping rings $i$ fitting over said projections having socket-holes in line with the spokes in combination with spokes having pins in the ends thereof, said pins having a beveled inner face and of plugs with a beveled outer face firmly secured in the spokes in contact with the inner face of the pins substantially as described and for the purpose set forth.

3. A rim, a tubular threadless spoke, a bolt inserted within the spoke, and threadless bodily endwise movable means within the spoke acting upon the inner end of said bolt, one of said parts being rotatable in contact with the end of said bolt, whereby the bolt may be forced outward to connect the spoke with the rim.

4. The combination with a threadless tubular spoke, a detachable rim and a bolt slidably mounted within the spoke with co-operating interlocking engaging means between the rim and the outer end of the bolt, of means within the spoke for engagement with the inner end of the bolt, whereby rotative engagement between the inner end of the bolt and said means serves to force the bolt outward into interlocking engagement with the rim.

In testimony, whereof I have signed my name to this specification in the presence of two subscribing witnesses.

RUDOLF KRONENBERG.

Witnesses:
   WOLDEMAR HAUPT,
   ARTHUR SCHROEDER.